Patented Jan. 31, 1928.

1,657,753

UNITED STATES PATENT OFFICE.

ALPHONS O. JAEGER AND JOHANN A. BERTSCH, OF ST. LOUIS, MISSOURI, ASSIGNORS TO SELDEN COMPANY, OF PITTSBURGH, PENNSYLVANIA, A CORPORATION OF DELAWARE.

CATALYTIC OXIDATION OF SULPHUR DIOXIDE.

No Drawing. Application filed February 6, 1926. Serial No. 86,652.

This invention relates to the catalytic oxidation of sulphur dioxide and more particularly to the catalytic oxidation of sulphur dioxide in the present of catalysts containing catalytic elements incorporated in base exchange silicates, or their dehydration products.

It has been proposed to introduce catalytic bases or cations into zeolites, either natural or artificial, by base exchange. Such catalysts are of low efficiency, particularly when used in the contact process for the oxidation of sulphur dioxide. In cases where the catalytic radicals or elements are acid radicals or where it is desired to use a plurality of catalytic elements or radicals, some of which are bases and some of which are acid radicals, the simple method of base exchange cannot be used. Thus, it is not possible to introduce acid radicals such as $V_2O_5$, $MoO_3$, $UO_3$, $CrO_3$, $Mn_2O_7$, $Mn_2O_5$, $WO_3$, into the zeolite by direct base exchange.

It is one of the objects of the present invention to produce novel, highly efficient catalysts and contact masses for the oxidation of sulphur dioxide, which catalysts contain catalytic acid radicals in combination with zeolites. The word "zeolite" throughout the specification and claims will be used to cover not only the hydrated polysilicates which readily exchange their bases in the presence of metal salt solutions, but also the pseudomorphic hydration products of these compounds, such as nepheline, leucite, felspar, and felspathic rock, and the like, which exchange their bases very slowly, if at all, but which for the purpose of the present invention, are the equivalents of the polysilicates which exchange their bases with great readiness and which are usually designated as zeolites.

With these and other objects in view, the invention contemplates the oxidation of sulphur dioxide in the presence of zeolites which are combined with acidic radicals of catalytic elements. We do not in this application claim the novel catalysts as new chemical products, this constituting part of the subject-matter of our co-pending application, Serial No. 91,229, filed February 27, 1926.

A large number of zeolites can be used as the raw material for the production of catalysts for use in the present invention. For the most part, the zeolites are silicates or silico-aluminates, and various bases may be present which have either no catalytic power, such as the alkali metals, the alkaline earth metals, zinc, and lead, or only a very small and insufficient power, such as the rare earths, titanium, aluminum, zirconium, thorium, chromium, molybedenum, tungsten, uranyl, antimonyl, manganese, vanadyl. Other bases may have activating powers or may increase the efficiency of other catalysts or resistance to high temperatures, such as iron, nickel, cobalt, copper, silver and gold. Complex bases may also be present in the zeolites as exchangeable bases.

A plurality of the above described bases may be introduced simultaneously or successively into a single zeolite or into a plurality of different zeolites and various combinations of zeolites with the same bases and the same zeolites with different bases may be used.

The zeolites, natural or artificial, which do not contain vanadium, tungsten, molybdenum, uranium, chromium, manganese, as non-exchangeable components of the zeolites, as described in our co-pending applications Serial No. 100,818, filed April 9, 1926, and Serial No. 95,771, filed March 18, 1926, possess little or no catalytic power and are entirely inadequate as catlysts for the oxidation of sulphur dioxide, particularly under the conditions to be described below and particularly at the temperatures therein set out.

We have found, surprising as it may seem, that these zeolites, although themselves catalytically inactive or having but feeble catalytic power, yield catalysts of high efficiency for the contact sulphuric acid process when they are treated at ordinary or elevated temperatures with vanadic acid or soluble vanadates or acids, such as tungstic acid, molybdic acid, chromic acid, uranic acid, manganic acid, and the corresponding per-acids, poly-acids or complex cations of these acids or their salts. The acids appear to combine with the metal polysilicates to form novel compounds. We do not know the exact chemical composition of these compounds, nor have we proved that in any particular case a single compound is formed. The present invention is, therefore, not limited to any particular explanation of the chemical combinations which result in the novel catalysts of the present invention.

The above mentioned acid radicals can be used singly or in mixture or the zeolites can be treated successively with different acid radicals or different mixtures of acid radicals. The amount of acid radicals acting can also be so regulated that the resulting combination with the zeolites possess the character of acids or bases or neutral salts. Mixtures of different zeolites may also be used.

We do not know precisely why the new catalysts of the present invention possess such high efficiency and particularly possess efficiencies very much greater than the acid radicals, either in the form of acids or salts, possess in the free state. It seems, however, that the zeolites act as positive activators partly due to their physical nature which results in an extremely homogeneous fine division of the catalytic elements and which due to the homogeneous components and porous honeycomb-like structure presents an enormous surface to the reaction gases. As in many cases, the porosity of the zeolites is substantially micronic, and it is possible and in fact probable that the gas pressure in the minute pores is considerably greater than in the converters owing to the high surface energy of such fine pores, particularly where the average diameter is in the order of the micron or less. The zeolites also appear to possess an activating power due to their chemical composition and we are of the opinion that this is probably mainly due to the presence of silica in a more or less hydrated form as we have found in our experiments that hydrated silica appears to enhance the activity of catalysts for the oxidation of sulphur dioxide. We put forward these explanations merely as the best which we are able to give and the invention is in no sense limited to the chemical or physical hypotheses put forward.

It is, of course, obvious that the catalytically active zeolites of the present invention may be mixed in various proportions to bring about particular desired effects and it should be clearly understood that the invention includes all mixtures of the new catalysts and is not limited by the specific catalysts or mixtures of catalysts which will be described below.

The catalytically active zeolites may be used alone in the catalytic oxidation of sulphur dioxide, but their activity is so great that it is frequently not necessary and may in many cases be desirable to mix them with inert or weakly catalytic carriers or diluents in powdered or granular form, such as sand, powdered rocks which are rich in quartz, glass powder, pumice meal, asbestos meal or fibres, kieselguhr, fuller's earth, silica, porcelain, earthenware fragments, pumice, diatomaceous stones, filter stones, quartz, etc.

The catalytically active zeolites may also be coated or cemented on more massive carriers such as quartz, acid resistant minerals, particularly such catalytically active minerals as burnt pyrites, rutile, ilmenite, titaniferous iron ore, chrome oxide, manganese oxide, bauxite, copper oxide, nickel oxide, cobalt oxide, barium oxide, etc. Roughened metals and metal alloys, and particularly such metals and alloys as are themselves catalytically active, form excellent carriers. Examples of such metals and alloys are chromium, ferro-chrome, ferro-vanadium, silicon-aluminum-ferro-manganese, ferro-manganese, ferro-molybdenum, ferro-silicon-manganese, ferro-titanium, ferro-tungsten, ferro-nickel, ferro-chrome-nickel, etc.

Preferably, the catalysts, according to the present invention, should be treated with burner gases before use in the contact sulphuric acid processes, although this preliminary treatment is not essential and the contact mass may be directly placed in the sulphuric acid converters and burner gases of various concentrations passed over at a temperature of 380–450° C., whereupon the contact process begins within a very short time and excellent yields are produced at an average temperature of about 440° C. with the usual gas velocities.

The contact masses of the present invention are highly resistant to high temperatures and this feature permits of a continuous operation at a considerably higher temperature so that parts of the contact mass or even the whole may be continuously operated at a temperature up to 580° C. which permits a greatly increa ed yield of $SO_3$ due to the possibility of using higher gas speeds without destroying the catalysts or lowering the percentage yield.

The catalysts described equal in effectiveness platinum contact masses and thus form an excellent substitute for platinum. These may be used in combination with any other contact mass either as a preliminary catalyst, a final catalyst, or in mixture. The contact masses may also be used in mixtures or in layers and the catalytic activity of the layers may be varied where this proves to be desirable.

The zeolite contact masses after treatment with the catalytically active acid radicals may be freed partially or wholly of their water of crystallization and water of hydration and then are transformed more or less completely into the pseudomorphous silicates, retaining the physical structure of the zeolites which renders them particularly suitable for catalytic purposes so that their catalytic properties are not affected. The use of such pseudomorphous silicates constitutes one of the features of the present invention.

The following specific examples serve to illustrate various modifications of the invention which is, however, not limited to the exact catalysts we set forth therein.

*Example 1.*

100 parts of an artificial sodium zeolite, prepared either by melting or by a wet process, is transformed into the corresponding copper zeolite by continued digestion with a 10% copper sulphate solution. The copper zeolite is washed and then treated, under gentle warming, with a 10% potassium vanadate solution, whereby it is transformed into the vanadate of the copper zeolite.

This new colored body is washed, dried first at temperatures below 100° C. and is then ready for use.

Instead of copper,—nickel, cobalt, silver, manganese, chromium and the like can be introduced into the artificial zeolite by base exchange and the subsequent treatment with potassium vanadate produces analogous highly effective catalysts.

Instead of using the contact masses, above described, alone, they may be cemented onto carriers, such as quartz, burnt pyrites, titaniferous iron ore, ferro-chrome and the like, by means of a little water glass. Preferably, the catalysts are applied to the carriers after drying and pulverizing. The resulting contact masses are highly active in the catalytic oxidation of sulphur dioxide.

When 7% burner gases are passed over the contact masses above described at the usual gas velocity and at an average temperature of 450° C. good yields of $SO_3$ are obtained, the yields being far superior to those obtainable with ordinary copper vanadate catalysts. The contact mass is also extraordinarily resistant to high temperatures and can be used successively in connection with gases containing low percentages of $SO_2$.

*Example 2.*

100 parts of an artificial potassium zeolite, which has been prepared by wet methods and which has been diluted during formation with acid resistant pulverized material, such as sand, ground basalt, etc., is treated with a 10% solution containing equal amounts of silver sulphate and copper sulphate. The mixture is preferably gently warmed during the treatment and the mixed copper silver zeolite produced is washed and a 10% potassium vanadate solution is allowed to trickle over it at about 65° C. forming the so-called vanadate of the copper silver zeolite.

After drying, the new product is an excellent contact mass for the oxidation of sulphur dioxide and is extraordinarily resistant to heat, giving excellent yields almost equal to equilibrium yields when used with 6 to 8% burner gases at 400–500° C. Instead of copper and silver, other metal mixtures such as zinc, nickel, cobalt, manganese, chromium and the like may be introduced simultaneously or successively by base exchange.

*Example 3.*

1000 parts of artificial zeolite are warmed gently and a 5% ferric-chloride solution is allowed to trickle over it until the base exchange is practically completed. The iron zeolite formed is washed and treated at 50° C. with a dilute solution of 75% potassium vanadate and 25% potassium molybdate. The vanado-molybdate of the iron zeolite is formed and after drying can be used as a contact mass.

When 6 to 8% of burner gases are passed over the catalysts at 400–500° C., the contact sulphuric acid process sets in shortly and an almost theoretical conversion of $SO_2$ to $SO_3$ is effected.

Instead of iron,—nickel, cobalt, copper, silver, manganese, chromium, or their mixtures, may be used simultaneously or successively, and the molybdate may be replaced by corresponding compounds of chromic acid, tungstic acid, uranic acid, sulphuric acid, arsenic acid, or permanganic acid, or mixtures which can be used successively or simultaneously.

*Example 4.*

1000 parts of an artificial sodium zeolite are transformed into the corresponding calcium zeolite by means of a 10% calcium chloride solution. The calcium zeolite is then treated with a dilute potassium vanadate solution, washed and dried, and is ready for use.

6 to 8% of burner gases are passed over at 400–500° C. and excellent yields of $SO_3$ are obtained. Lower percentage burner gases may also be used and give good yields.

Calcium may be substituted wholly or partly by barium, strontium, zinc, lead or other cations which are in themselves practically catalytically inactive.

*Example 5.*

1000 parts of an artificial or suitable natural zeolite are first treated with sufficient 10% barium chloride solution to bring about a partial base exchange. Thereupon, the product is treated with a 5% silver nitrate solution so that finally a barium-silver-zeolite is obtained. This barium-silver-zeolite is then treated with a potassium vanadate solution to form the corresponding vanadate. These contact masses are excellent catalysts for the oxidation of sulphur dioxide.

Obviously, a large number of other combinations can be used to produce catalysts of analogous compositions.

*Example 6.*

A solution of 5 to 6 parts of potassium-aluminate is permitted to act on about 7 to 10 parts of hydrated silicic acid and warmed for 1 to 2 hours. Subsequently, kieselguhr or sand is stirred in during the warming to cause the mass to become thickly fluid. The liquid is then sucked off and the diluted zeolite washed for a short time with water, dried at temperatures under 100° C. and hydrated. A dilute uranyl-nitrate solution is permitted to trickle over the zeolite thus formed and transforms it into the corresponding uranyl zeolite. This zeolite is then treated with a dilute potassium vanadate solution whereupon the mass turns a light lemon yellow and the vanadate of the uranyl zeolite is formed.

Instead of uranyl, other analogous metal oxygen radicals may be introduced into the zeolite such as antimonyl and vanadyl alone or mixed simultaneously or successively. The vanadate solution can be partly substituted by the soluble salts of molybdic acid, tungstic acid, uranic acid, arsenic acid, chromic acid, permanganic acid, sulphuric acid. Mixtures of the salts of these acids may also be used successively or simultaneously.

The above described catalysts after drying, may be used directly in the contact sulphuric acid process or they may be pulverized and affixed to active or inactive granular carriers as described above and used in this form. Excellent conversions of $SO_2$ to $SO_3$ are obtained with dilute or 7% burner gases at 440–470° C.

The zeolites of the present invention, when used in the catalytic oxidation of sulphur dioxide, may and frequently do suffer a small surface change during the process. These changes may be chemical or physical in nature or may be a combination of both. It is also desirable for some purposes to treat the catalysts before use in order to effect a change of the surface, for example, in some cases it may be desirable to more or less silicify the surface. It should be understood that the claims are intended to cover the use of zeolites with or without surface changes which changes for the most part do not injuriously affect the reaction.

Having thus described our invention, what we desire to procure by United States Letters Patent and claim is:

1. The process of catalytically oxidizing sulphur dioxide which comprises passing gases containing sulphur dioxide and oxygen at an elevated temperature over a contact mass comprising at least one zeolite combined with at least one catalytically active acid radical.

2. The process of catalytically oxidizing sulphur dioxide which comprises passing gases containing sulphur dioxide and oxygen at an elevated temperature over a contact mass comprising at least one zeolite combined with at least one catalytically active acid radical containing an element of the fifth, sixth and seventh groups of the periodic system.

3. The process of catalytically oxidizing sulphur dioxide which comprises passing gases containing sulphur dioxide and oxygen at an elevated temperature over a contact mass comprising at least one zeolite combined with at least one catalytically active acid radical containing vanadium.

4. The process of catalytically oxidizing sulphur dioxide which comprises passing gases containing sulphur dioxide and oxygen at an elevated temperature over a contact mass containing at least one zeolite combined with a vanadate.

5. The process of catalytically oxidizing sulphur dioxide which comprises passing gases containing sulphur dioxide and oxygen at temperature above those at which platinum free non-zeolite vanadium catalysts are rapidly deteriorated but not materially in excess of 580° C. over a contact mass comprising at least one zeolite combined with at least one catalytically active anion.

6. The process of catalytically oxidizing sulphur dioxide which comprises passing gases containing sulphur dioxide and oxygen at elevated temperatures above those at which platinum free non-zeolite vanadium catalysts are rapidly deteriorated but not materially in excess of 580° C. over a contact mass comprising at least one zeolite combined with a vanadate.

7. The process of catalytically oxidizing sulphur dioxide which comprises passing gases containing sulphur dioxide and oxygen at an elevated temperature over a contact mass comprising at least one pseudomorphous dehydrated zeolite combined with at least one catalytically active acid radical.

8. The process of catalytically oxidizing sulphur dioxide which comprises passing gases containing sulphur dioxide and oxygen at an elevated temperature over a contact mass comprising at least one pseudomorphous dehydrated zeolite combined with a vanadate.

9. The process of catalytically oxidizing sulphur dioxide which comprises passing gases containing sulphur dioxide and oxygen at an elevated temperature over a contact mass comprising at least one zeolite containing catalytically active bases in exchangeable form combined with at least one catalytically active acid radical.

10. The process of catalytically oxidizing sulphur dioxide which comprises passing gases containing sulphur dioxide and oxygen at an elevated temperature over a contact mass comprising at least one zeolite containing catalytically active bases in exchangeable form combined with a vanadate.

11. The process of preparing a catalyst for the catalytic oxidation of sulphur dioxide which comprises causing a zeolite to combine with at least one catalytically active acid radical and treating the catalyst with gases containing oxygen and sulphur dioxide at elevated temperatures until a high percentage of conversion of sulphur dioxide to sulphur trioxide begins.

12. The process of preparing a catalyst for the catalytic oxidation of sulphur dioxide which comprises causing a zeolite to combine with at least one catalytically active acid radical containing an element of the fifth, sixth and seventh groups of the periodic system and treating the catalyst with gases containing oxygen and sulphur dioxide at elevated temperatures until a high percentage of conversion of sulphur dioxide to sulphur trioxide begins.

13. The process of preparing a catalyst for the catalytic oxidation of sulphur dioxide which comprises causing a zeolite to combine with at least one catalytically active acid radical containing vanadium and treating the catlyst with gases containing oxygen and sulphur dioxide at elevated temperatures until a high percentage of conversion of sulphur dioxide to sulphur trioxide begins.

14. The process of preparing a catalyst for the catalytic oxidation of sulphur dioxide which comprises causing a zeolite to combine with at least one catalytically active anion containing a vanadate and treating the catalyst with gases containing oxygen and sulphur dioxide at elevated temperatures until a high percentage of conversion of sulphur dioxide to sulphur trioxide begins.

15. The process of catalytically oxidizing sulphur dioxide which comprises passing gases containing sulphur dioxide and oxygen at an elevated temperature over a contact mass comprising at least one zeolite combined with at least one catalytically active acid radical, said zeolite being associated with diluent particles.

16. The process of catalytically oxidizing sulphur dioxide which comprises passing gases containing sulphur dioxide and oxygen at an elevated temperature over a contact mass comprising at least one zeolite combined with at least one catalytically active acid radical, said zeolite being associated with diluent particles to form a physically homogeneous structure.

17. The process of catalytically oxidizing sulphur dioxide which comprises passing gases containing sulphur dioxide and oxygen at an elevated temperature over a contact mass comprising at least one zeolite combined with at least one catalytically active acid radical, said zeolite being associated with diluent particles of sub-micronic porosity.

18. The process of catalytically oxidizing sulphur dioxide which comprises passing gases containing sulphur dioxide and oxygen at an elevated temperature over a contact mass comprising at least one zeolite combined with at least one catalytically active acid radical physically associated with siliceous diluent particles.

19. The process of catalytically oxidizing sulphur dioxide which comprises passing gases containing sulphur dioxide and oxygen at an elevated temperature over a contact mass comprising at least one zeolite combined with at least one catalytically active acid radical, said zeolite contact mass being coated on massive carrier fragments.

20. The process of catalytically oxidizing sulphur dioxide which comprises passing gases containing sulphur dioxide and oxygen at an elevated temperature over a contact mass comprising at least one zeolite combined with at least one catalytically acid radical containing vanadium, said zeolite being associated with diluent particles.

21. The process of catalytically oxidizing sulphur dioxide which comprises passing gases containing sulphur dioxide and oxygen at an elevated temperature over a contact mass comprising at least one zeolite combined with at least one catalytically active acid radical containing vanadium, said zeolite being associated with diluent particles to form a physically homogeneous structure.

22. The process of catalytically oxidizing sulphur dioxide which comprises passing gases containing sulphur dioxide and oxygen at an elevated temperature over a contact mass comprising at least one zeolite combined with at least one catalytically active acid radical, containing vanadium, said zeolite being associated with diluent particles of sub-micronic porosity.

23. The process of catalytically oxidizing sulphur dioxide which comprises passing gases containing sulphur dioxide and oxygen at an elevated temperature over a contact mass comprising at least one zeolite combined with at least one catalytically active acid radical containing vanadium, physically associated with siliceous diluent particles.

24. The process of catalytically oxidizing sulphur dioxide which comprises passing gases containing sulphur dioxide and oxygen at an elevated temperature, over a contact mass comprising at least one zeolite combined with at least one catalytically active acid radical containing vanadium, said zeolite contact mass being coated on massive carrier fragments.

Signed at St. Louis, Missouri, this 3rd day of February, 1926.

ALPHONS O. JAEGER.
JOHANN A. BERTSCH.

bined with at least one catalytically active acid radical containing vanadium, physically associated with siliceous diluent particles.

24. The process of catalytically oxidizing sulphur dioxide which comprises passing gases containing sulphur dioxide and oxygen at an elevated temperature over a contact mass comprising at least one zeolite combined with at least one catalytically active acid radical containing vanadium, said zeolite contact mass being coated on massive carrier fragments.

Signed at St. Louis, Missouri, this 3rd day of February, 1926.

ALPHONS O. JAEGER.
JOHANN A. BERTSCH.

CERTIFICATE OF CORRECTION.

Patent No. 1,657,753.  Granted January 31, 1928, to

ALPHONS O. JAEGER ET AL.

It is hereby certified that the above numbered patent was erroneously issued to "Selden Company, of Pittsburgh, Pennsylvania, a corporation of Delaware", as assignee of the entire interest in said invention, whereas said Letters Patent should have been issued to "Alphons O. Jaeger and Johann A. Bertsch, said Jaeger assignor to The Selden Company, of Pittsburgh, Pennsylvania, a Corporation of Delaware", as shown by the records of assignments in this office.

Page 1, line 4, for the word "present" read "presence", and line 62, for "molybedenum" read "molybdenum"; and that the said Letters Patent should be read with these corrections therein that the same may conform to the record of the case in the Patent Office.

Signed and sealed this 21st day of February, A. D. 1928.

Seal.

M. J. Moore,
Acting Commissioner of Patents.

CERTIFICATE OF CORRECTION.

Patent No. 1,657,753.    Granted January 31, 1928, to

ALPHONS O. JAEGER ET AL.

It is hereby certified that the above numbered patent was erroneously issued to "Selden Company, of Pittsburgh, Pennsylvania, a corporation of Delaware", as assignee of the entire interest in said invention, whereas said Letters Patent should have been issued to "Alphons O. Jaeger and Johann A. Bertsch, said Jaeger assignor to The Selden Company, of Pittsburgh, Pennsylvania, a Corporation of Delaware", as shown by the records of assignments in this office.

Page 1, line 4, for the word "present" read "presence", and line 62, for "molybedenum" read "molybdenum"; and that the said Letters Patent should be read with these corrections therein that the same may conform to the record of the case in the Patent Office.

Signed and sealed this 21st day of February, A. D. 1928.

Seal.

M. J. Moore,
Acting Commissioner of Patents.